United States Patent [19]
Maeda

[11] 3,838,487
[45] Oct. 1, 1974

[54] APPARATUS FOR ALIGNING WELDING JOINTS

[75] Inventor: Kazuo Maeda, Chiba, Japan

[73] Assignee: Mitsui Shipbuilding and Engineering Co. Ltd., Tokyo, Japan

[22] Filed: Feb. 26, 1973

[21] Appl. No.: 335,587

[52] U.S. Cl. .................. 29/200 P, 269/26, 269/42, 269/104
[51] Int. Cl. ........................................... B23p 19/00
[58] Field of Search .......... 219/101; 269/20, 24, 25, 269/26, 27, 30, 31, 32, 33, 41, 42, 92, 94, 104, 126; 29/200 P

[56] References Cited
UNITED STATES PATENTS
1,729,076   9/1929   Laycock .............................. 269/32

FOREIGN PATENTS OR APPLICATIONS
609,463   9/1948   Great Britain.................. 219/101
122,463   10/1946  Australia............................ 269/32

Primary Examiner—Roy Lake
Assistant Examiner—Mark S. Bicks
Attorney, Agent, or Firm—Howson & Howson

[57] ABSTRACT

Apparatus for fitting the L-sectioned joints of members to be welded into welding alignment prior to the welding thereof comprising a pattern member adapted to abut on under surfaces of angles of the joints and hydraulic cylinders adapted to urge the angles of the joints to the pattern member.

4 Claims, 3 Drawing Figures

PATENTED OCT 1 1974 3,838,487

APPARATUS FOR ALIGNING WELDING JOINTS

The present invention relates to an apparatus for aligning welding joints of large-sized structures such as hull modules used in shipbuilding, and more particularly to an apparatus particularly suited for performing butt welding of joints each having L- or T-shaped section.

An object of the present invention is to provide an apparatus for fitting the joints of members to be welded into precise alignment with ease prior to the welding thereof.

The apparatus in accordance with the present invention comprises a pattern member spanning joints of two adjoining members to be welded and abutting on one side face of each of said member, and two pressing members arranged to cross each other at right angles and to press said member against said pattern member.

Figure 1:
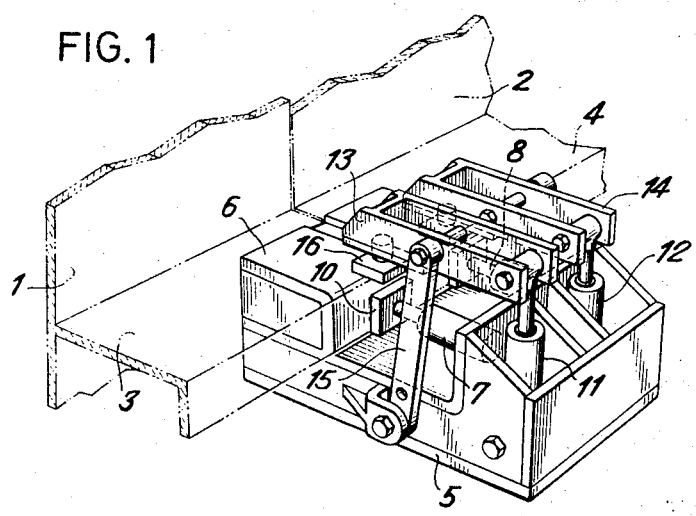
FIG. 1 is a perspective view of the apparatus in accordance with the present invention.
Figure 2:
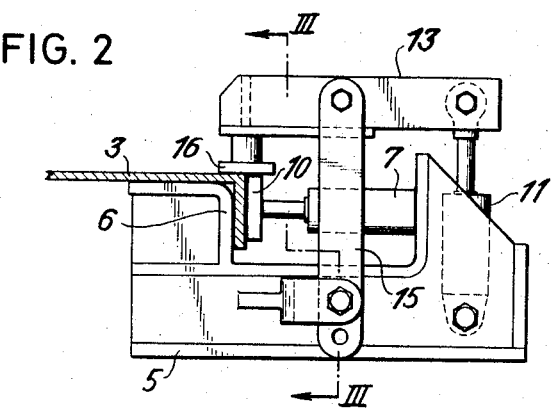
FIG. 2 is a side view thereof.
Figure 3:
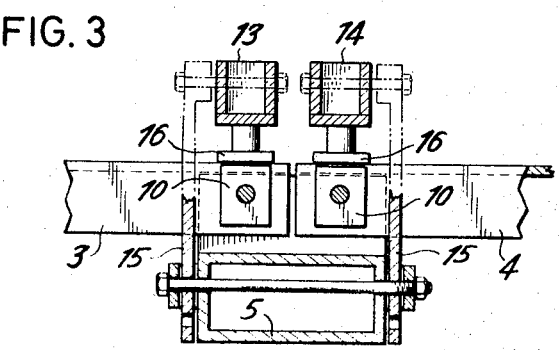
FIG. 3 is a sectional view taken along the line III — III of FIG. 2.

Now, the device is described in detail with reference to the drawings.

In the drawings, numerals 1 and 2 designate hull modules to be welded each other, and 3 and 4 designate longitudinal members which have L-shaped section and are to be aligned according to the present invention. The body 5 includes an L-sectioned pattern portion 6 which spans said both frames 3, 4 and abuts on the under surfaces of the angles thereof. Disposed in opposition to one side of the pattern portion are a pair of horizontal hydraulic cylinders 7, 8 which are so arranged that the pressing plates 10 carried at the ends of their respective piston rods will abut against the end face of the respective longitudinal members 3 and 4. There are also provided in the body portion a pair of vertical hydraulic cylinders 11, 12. The ends of their respective piston rods are secured to ends of the levers 13, 14 supported by the upper ends of a pair of levers 15. Carried at other ends of the levers 13, 14 are the pressing plates 16 arranged to abut on the upper faces of the angles of the longitudinal members.

For aligning the longitudinal members according to the present invention, the pattern portion 6 is placed in contact with the undersides of the angles of the longitudinal members 3, 4, and then the pressing plates 10 are positioned in abutment against the respective longitudinal members to press them against the pattern portion 6 by using the horizontal hydraulic cylinders 7, 8. Also, the levers 13, 14 are turned by the vertical hydraulic cylinders 11, 12 to press the pressing plates 16 against the respective longitudinal members thereby force them against the pattern portion 6. Whereby the longitudinal members are fitted into precise alignment. After completing this alignment, the device is detouched and then the welding operation is carried out.

What is claimed is:

1. Apparatus for positioning endwise adjacent one another a pair of structural members each having a web and at least one flange disposed at an angle with respect to the web to facilitate welding of the same together and for reshaping the webs and flanges to ensure precise endwise alignment thereof prior to welding, said apparatus comprising:

a body having anvil means providing a pair of elongated pattern surfaces disposed at a predetermined angle with respect to one another, one surface adapted to be engaged by one side of the web of each member and the other surface adapted to be engaged by one side of the flange of each member;

a pair of clamping plates carried by said body at spaced locations across from said one pattern surface;

means mounting said clamping plates for movement in spaced paths toward and away from said one pattern surface;

a pair of shaping plates carried by said body at spaced locations adjacent said pair of clamping plates and across from the other pattern surface;

means mounting each shaping plate for movement independently of its associated clamping plate and in paths transverse to the paths of movement thereof toward and away from said other pattern surface;

said pattern surfaces spanning in a continuous fashion across the spaced paths of movement of said plates; and means for urging said plates toward and away from their respective pattern surfaces;

so that when the structural members are disposed on the pattern surfaces with a gap between their ends, movement of the plates toward their respective pattern surfaces causes the webs and flanges to be displaced into precise endwise alignment.

2. Apparatus according to claim 1 wherein said body has a recessed portion extending away from said pattern surfaces for receiving said flanges at one end and said shaping plate urging means are mounted at the other end of said recessed portion for movement therein.

3. Apparatus according to claim 1 wherein said clamping plate mounting means includes a pair of levers each mounting at one end one of said pair of clamping plates, and means mounting each lever to said body for pivotal movement about an axis extending alongside said pattern surfaces, said urging means being connected to the other end of each lever and said body for pivoting the levers to urge the web clamping plates in said path transverse to said flange shaping plates.

4. Apparatus according to claim 3 wherein said urging means connected to said levers is pivotally mounted to said body a spaced distance from said pattern surfaces and said lever pivot-mounting means including a link pivotally connected at one end to said body and pivotally connected at its other end to said lever intermediate the ends thereof.

* * * * *